United States Patent [19]

Drost

[11] 4,347,706
[45] Sep. 7, 1982

[54] ELECTRIC POWER GENERATING PLANT HAVING DIRECT COUPLED STEAM AND COMPRESSED AIR CYCLES

[75] Inventor: Monte K. Drost, Richland, Wash.

[73] Assignee: The United States of America as represented by the United States Department of Energy, Washington, D.C.

[21] Appl. No.: 222,864

[22] Filed: Jan. 7, 1981

[51] Int. Cl.³ .............................................. F01K 3/00
[52] U.S. Cl. ........................................ 60/659; 60/676; 290/52
[58] Field of Search ................. 60/659, 652, 655, 676; 290/52

[56] References Cited

U.S. PATENT DOCUMENTS

| | | | |
|---|---|---|---|
| 1,846,389 | 2/1932 | Gay | 60/39.18 |
| 3,614,268 | 10/1971 | Merenda | 417/237 |
| 3,935,469 | 1/1976 | Haydock | 60/39.14 X |
| 3,943,374 | 3/1976 | Clements | 415/500 X |
| 4,049,299 | 9/1977 | Rigollot | 290/52 |
| 4,077,748 | 3/1978 | Pötz | 417/319 |
| 4,094,148 | 6/1978 | Nelson | 60/652 |
| 4,100,745 | 7/1978 | Gyarmathy et al. | 60/659 |
| 4,117,343 | 9/1978 | Hoffeins | 290/52 |
| 4,124,805 | 11/1978 | Jacoby | 60/641 X |
| 4,158,145 | 6/1979 | Kartsounes et al. | 290/52 |
| 4,275,310 | 6/1981 | Summers et al. | 60/659 |

Primary Examiner—A. Michael Chambers
Attorney, Agent, or Firm—Paul A. Gottlieb; Richard G. Besha; James E. Denny

[57] ABSTRACT

An electric power generating plant is provided with a Compressed Air Energy Storage (CAES) system which is directly coupled to the steam cycle of the generating plant. The CAES system is charged by the steam boiler during off peak hours, and drives a separate generator during peak load hours. The steam boiler load is thereby levelized throughout an operating day.

3 Claims, 2 Drawing Figures ns such a direct coupled system. [sic]

ELECTRIC POWER GENERATING PLANT HAVING DIRECT COUPLED STEAM AND COMPRESSED AIR CYCLES

CONTRACTUAL ORIGIN OF THE INVENTION

The United States Government has rights in this invention pursuant to Contract No. DE-AC06-76RL01830 between the U.S. Department of Energy and Battelle Pacific Northwest Laboratories.

BACKGROUND OF THE INVENTION

This invention relates to electric generating power plants including Compressed Air Energy Storage (CAES) systems. More particularly, this invention relates to a CAES System which stores excess power from an electric power generating plant during off-peak hours and returns stored energy as peak power when required. More particularly, this invention relates to a CAES System in which the steam and compressed air energy storage cycles are directly coupled to form a Direct Coupled Steam/Compressed Air Energy Storage Cycle (DCS/CAES).

The electric utility industry has as its main objective the supply of power at the lowest possible cost. This purpose has lead to the development of large sophisticated nuclear and fossil-fuel-fired steam generating plants. For both technical and economical reasons, these plants should be operated at a steady load. However, to meet daily and seasonal fluctuations in power demands, the industry uses so called peaking units. The most common form of these units is gas turbine systems that use premium fuels such as natural gas and oil.

Because of the limited supply of oil and natural gas in this country and because of current problems in the supply of petroleum fuel from foreign sources, premium fuel has become very expensive and the long-term supply is uncertain; therefore, electric utilities have been exploring better ways of utilizing, or even eliminating, the use of premium fuels for peaking units and the possibility of operating their large power plants at steady or constant load. These considerations have lead to the investigation of energy storage systems.

Studies conducted by electric utilities indicate that CAES power plants are attractive for consideration as an energy storage system. A CAES plant may comprise a steam system including a boiler, steam turbine, and generator, and an air system including a motor driven compressor and an air turbine connected to a generator. Prior art air compressors are typically motor driven, their energy source being the steam driven generator. Hence, reduced efficiencies are incurred in this arrangement. Further, many systems require additional motors for booster air compressors. When compressed air is cooled and stored in an underground air storage reservoir, it is available to supply energy under peak load conditions. When released, the stored air is typically heated and expanded through one or more air turbines. Some systems have included a means for storing the heat of the air as it is compressed for storage and applying the stored heat to the stored air as it is expanded. In prior art arrangements, the air turbine is not shafted to the air compressor, in contrast to conventional peaking units.

The purpose of this arrangement is two-fold. Firstly, the compressor system is driven with cheap off-peak power from the main steam power generating plant and the energy is stored as compressed gas in a compressed gas reservoir. Secondly, during peak hours, the compressed air stored in the reservoir is utilized to run the turbines at their power. This is in contrast to a conventional gas turbine peaking unit wherein the total power output is reduced by $\frac{1}{3}$ to $\frac{2}{3}$. The reason for this reduction in power is because that portion of the system's power is used internally to operate compressors which are needed to supply compressed air to the turbine. By utilizing a CAES system, fuel savings on the order of 50% to 60% are possible. However, the CAES systems still have the problem of incurring energy conversion losses during off-peak hours when the steam energy is converted to electrical energy, which in turn is converted to compressed air energy.

Another problem encountered in the electric utility industry, in addition to peak loads, and peak load plants, are intermediate load power plants, those plants which operate for approximately eight hours a day. Currently, new intermediate load power plants are cycling coal-fired plants, cycling oil-fired plants, or combined cycle power plants. The cycling oil-fired plants and the combined cycle plants burn petroleum or natural gas which is undesirable, and they produce very expensive power. The cycling coal plant also produces expensive power. The DCS/CAES cycle has the potential to substantially reduce the cost of intermediate load electric power.

It is, therefore, an object of the present invention to provide an improved CAES power plant which substantially eliminates the inefficiencies of energy conversion. It is another object of the present invention to provide a continuously operated intermediate load power plant, the efficiency of each component thereof being increased by directly coupling the steam and compressed air energy storage cycles.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

Disclosed is an electrical generating power plant, including a Direct Coupled Steam/Compressed Air Energy Storage cycle (DCS/CAES) in which the steam power plant is directly coupled to the compressed air energy storage facility. The coal-fired steam cycle of the intermediate power plant is sized to accommodate a fraction of the intermediate load, and is operated continuously. The balance of the intermediate load is provided by a Compressed Air Energy Storage (CAES) cycle. The energy produced by the coal-fired steam cycle during off-peak hours is directed to a thermal storage unit and to a steam turbine system which is common to both the generator and CAES air compressor system. During off-peak hours, the generator is de-clutched from the steam turbine system, and the steam turbine system drives the air compressors of the CAES system. When needed during intermediate load peaks, stored air is expanded through air turbines which are shafted to an auxiliary electric generator. A substantial fraction of the heat of compression is recovered in the feed water system of the steam cycle. Generator, motor, and transmission line losses are eliminated for charging power. The steam generator does not cycle, and the steam cycle and CAES cycle equipment are presently commercially available, and need not be of special design.

BRIEF DESCRIPTION OF THE DRAWING

The present invention is illustrated in the accompanying drawing wherein.

DETAILED DESCRIPTION OF THE INVENTION

Figure 1:
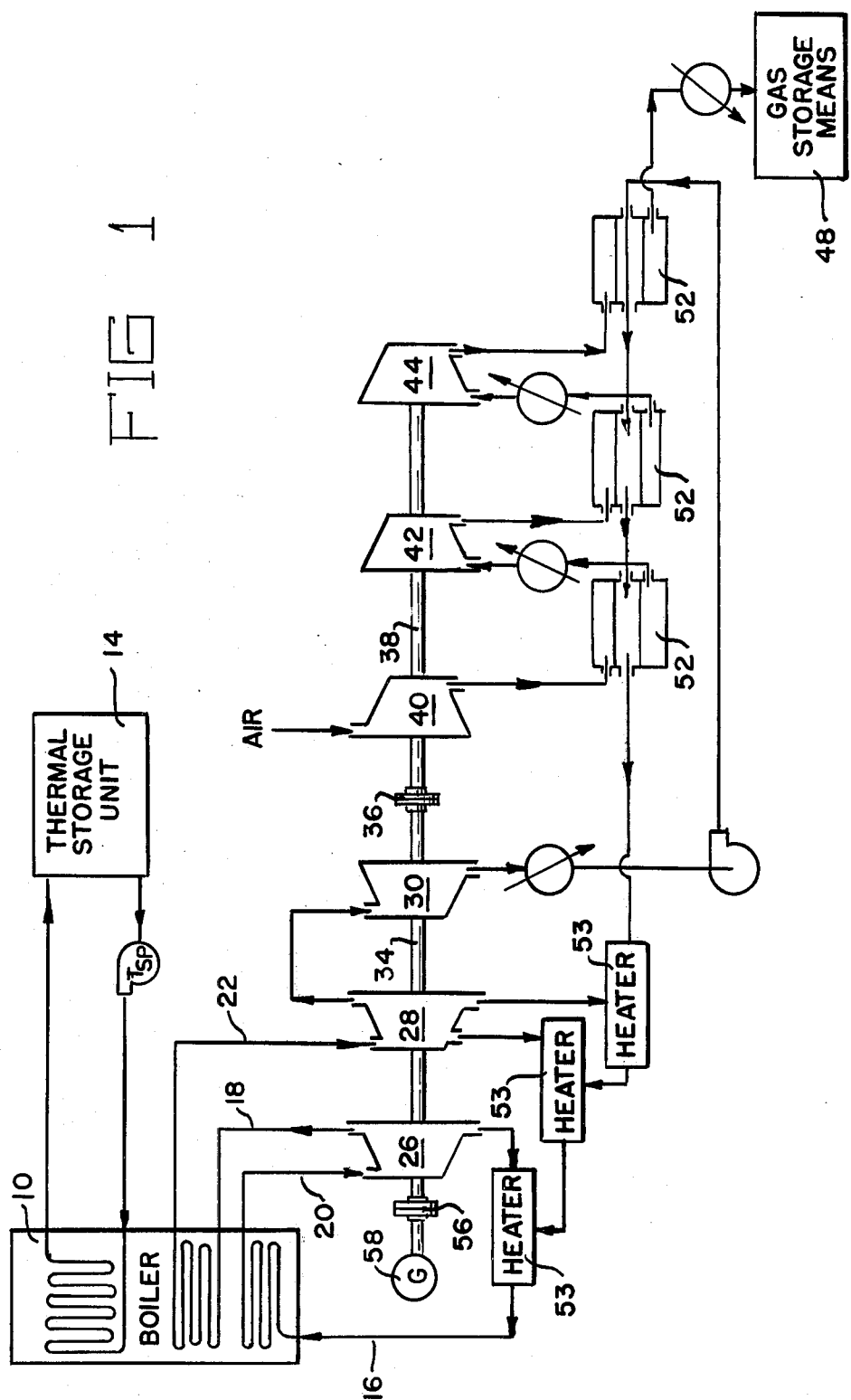
FIGS. 1 and 2 are block diagrams illustrating a system constructed according to this invention during compression and generation modes, respectively.

Referring now to FIG. 1, an intermediate load power plant according to the invention is shown in the compression, charge, or storage mode. A coal-fired combustor or boiler 10 provides thermal energy for thermal storage unit 14 and the production of steam in lines 20, 22. The steam drives conventional high pressure, intermediate pressure, and low pressure steam turbines 26, 28, and 30, respectively. The steam turbines drive steam shaft 34, which is connected through clutch 36 to air compressor shaft 38. Shaft 38 in turn drives conventional low pressure, high pressure and booster air compressors, 40, 42, and 44, respectively to compress air (or other gas) for storage in an underground reservoir or the like gas storage means 48. The heat liberated by the compressed air is transferred through feed water heaters 52 to feed water in line 16, entering boiler 10.

Thermal storage unit 14 is preferably of the conventional molten salt thermocline type wherein Hitec or other salt medium such as draw salt is pumped by thermal storage pump TSP through boiler 10 to thermal storage unit 14. Additional feed water heaters 53 transfer thermal energy from steam turbines 26, 28 to feed water in line 16.

Thus, in contrast to prior art arrangements, the steam turbine is clutched to the compressor train of the CAES cycle, some feed water is provided by the heat of compression generated during charging by the compressor train of the CAES cycle, and a portion of the thermal energy of boiler 10 is stored in the thermal storage unit 14. By directly coupling the steam turbine train to the air compressor train, the inefficiencies of energy conversion heretofore encountered are eliminated. That is, the intermediate system of electric generator and motor between the steam turbine and air compressor trains have been avoided.

Figure 2:
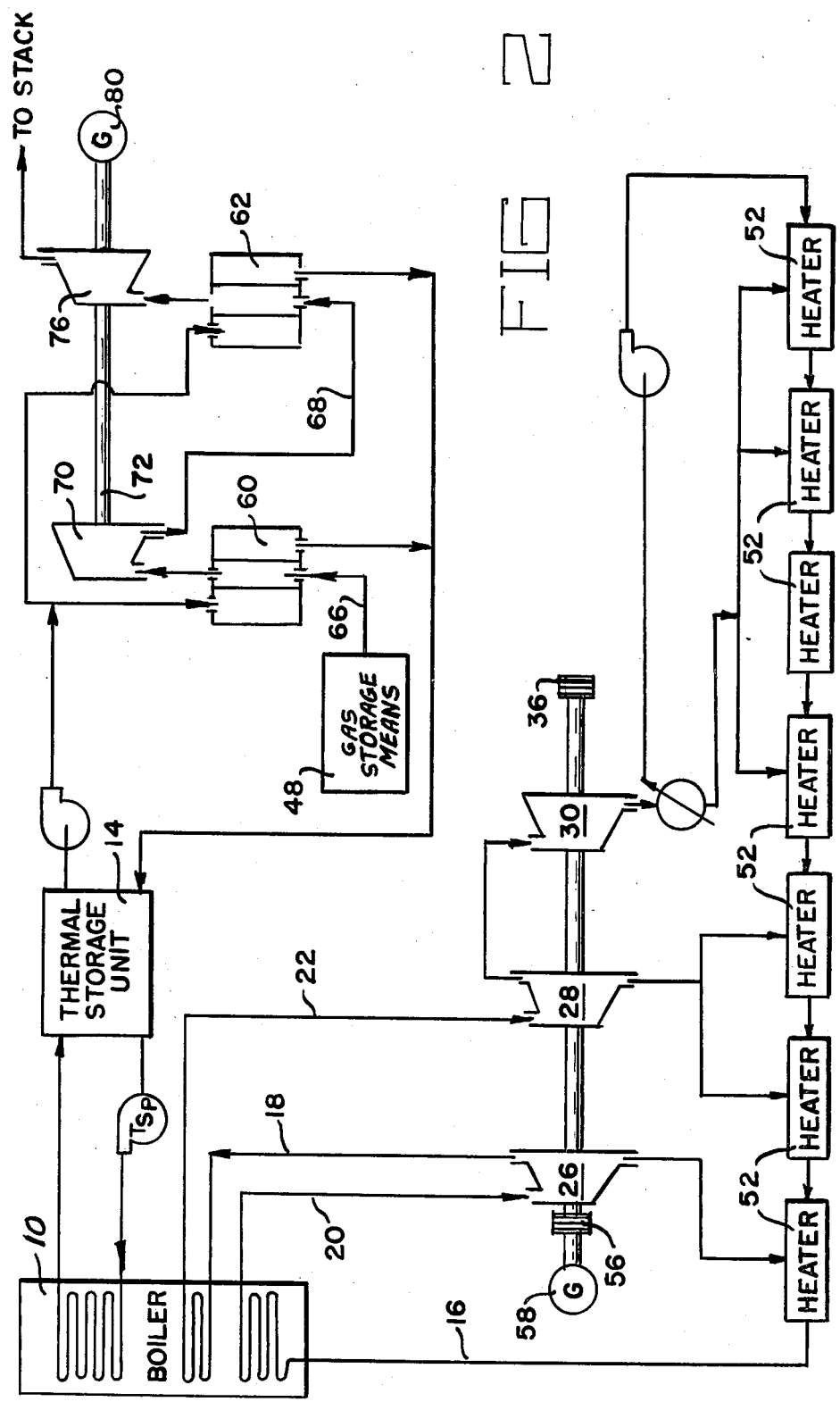

Referring now to FIG. 2, the intermediate load power plant according to the invention is shown in the generation or peak load mode. Clutch 36 connecting the steam turbine train of shaft 34 and turbines 26, 28, and 30 is disconnected from the CAES air compressor train of shaft 38 and compressors 40, 42, and 44. Shaft power is directed through clutch 56 to a first electric generator 58. Boiler 10 continues to provide heat to the thermal storage unit, even during the generation mode, to avoid cycling the molten salt heating surfaces in the boiler. Thermal energy from thermal storage unit 14 is transferred through air heaters 60, 62, to air in lines 66, 68. Air from storage reservoir 48 is applied through line 66, heated by heater 60 and expanded through conventional high pressure air turbine 70 to drive shaft 72. Air exiting turbine 70 is heated in air heater 62 and expanded through conventional low pressure air turbine 76 to assist in driving shaft 72. Shaft 72 in turn drives a second conventional electric generator 80. Thus, the electric supply of steam-driven generator 58 can be augmented by air-driven generator 80, as required. During this mode of operation, the steam turbines are clutched directly to generator 58. As a departure from prior art systems, air discharge from reservoir 48 is heated by thermal storage unit 14, a load on boiler 10, rather than by burning fuel in a less efficient system. Thus, during the discharge cycle, the steam turbine is clutched to its generator, and thermal energy is extracted from the steam cycle for feed water heating, to replace the heat of compression referred to above in the storage mode. Discharge air is heated by the thermal energy storage unit 14 and expanded in the air turbines, which are shafted to a second generator.

The DCS/CAES concept has several advantages over a separate steam plant used to provide power to a CAES plant. Generator, motor and transmission line losses are eliminated. A substantial fraction of the heat of compression is recovered, and no petroleum fuel is used outside of the boiler, since air heating is provided from the storage unit 14. It should be noted that steam generator does not cycle and that the steam cycle and the CAES cycle equipment are commercially available, thereby allowing the efficiency of each component to be increased, while levelizing the cost of electric energy produced by the intermediate load power plant.

In summary, it can be seen that a high-performance steam system operating continuously would provide the power to drive the CAES system compressor during the compression mode, and to supplement the total plant power output during the generation mode. Further, a coal-fired combustor or boiler which could be based on conventional boiler designs, would supply energy to the steam and thermal energy storage systems. The thermal energy storage system would utilize a molten salt or the like to both transmit energy from the coal-fired combustor to the thermal storage unit and from the thermal storage unit to the compressed air stored in reservoir 48, for use by the CAES power producing system during the generation mode. Energy rejected by intercooling of the CAES compressors would be recovered by using the energy to provide partial feed water heating in the steam system. Use of heat exchangers to transfer heat from the thermal energy storage system molten salt to the stored compressed air during the charging mode would permit clean heated air to be expanded through the CAES turbines, thereby keeping the turbines free from the corrosive and erosive elements normally found in the coal-fired combustion gases.

As one example of the advantage of the present invention, a cost comparison between intermediate load concepts was completed. Three concepts were considered: a combined cycle oil-fired plant, a cycling coal-fired plant, and a direct-coupled steam-CAES cycle. The costs were developed for a plant with a capacity factor of 0.307 and used costs and economic assumptions representative of current conditions. The results are given below in 1980 dollars.

|  | Levelized Bus Bar Energy Cost in mills/kWh |
|---|---|
| DCS/CAES | 95 |
| Cycling Coal Plant | 126 |
| Combined Cycle Plant | 146 |

The results indicate that the direct coupled steam-CAES cycle can reduce the cost of intermediate load power by 25% when compared to the next most attractive concept.

Alternative cycle arrangements include replacing the boiler with a fluid bed combustor. The combustor would provide steam to the steam cycle and heated air which could charge a pebble bed thermal energy storage system. During discharge, the air from storage would be heated in either the fluid bed combustor or in the direct contact pebble bed. This concept has the advantage of operating at higher temperatures than the molten salt concept described above, with resulting improvements in performance. A second alternative arrangement would add a regenerative heat exchanger on the discharge from the low pressure turbine used to preheat the air from storage, before it enters the high-pressure heat exchanger. This would reduce losses and improved cycle efficiency.

The embodiments of this invention in which an exclusive property or privilege is claimed are defined as follows:

1. An electric power generating plant having a predetermined base load capacity and means for storing off-peak energy for use as additional load capacity during peak load periods, comprising:

a boiler having a substantially continuous output;

a steam turbine having an energy input continuously coupled to said boiler output, and further having a continuously-driven output shaft;

a first clutch means coupled to said steam turbine output shaft;

a first electric generator having an input shaft coupled to said steam turbine output shaft through said first clutch means for disconnectable driving engagement with said steam turbine;

a second clutch means coupled to said steam turbine output shaft;

a gas compressor having an output, and an input shaft coupled to said steam turbine output shaft through said second clutch means for disconnectable driving engagement with said steam turbine;

a gas storage means having a selectively operable output, and an input connected to said gas compressor output;

thermal storage means coupled to said boiler for receiving thermal energy therefrom;

gas heater means coupled between said thermal storage means and said gas storage means output for heating stored gas outputted from said gas storage means;

gas turbine means driven by heated gas outputted from said gas storage means and said gas heater means;

a second electric generator coupled to said gas turbine means for receiving driving energy therefrom;

means for disconnecting said first electric generator from said steam turbine output shaft while connecting said gas compressor to said steam turbine output shaft during a first predetermined period of generating plant operation;

means for connecting said first electric generator to said steam turbine output shaft while disconnecting said gas compressor output shaft during a second predetermined period of generating plant operation; and means for operating said gas storage means output so as to drive said second electric generator therewith during said second predetermined period of generating plant operation.

2. The device of claim 1 further including:

feedwater means for supplying water to said boiler for heating therein to produce steam to drive said steam turbine; and feedwater heater means coupled to said gas compressor means to transfer heat from said gas compressor means to water contained in said feedwater means.

3. The device of claim 1 wherein said thermal storage means comprise molten salt heated by said boiler and cooled by gas released from said gas storage means.

* * * * *